(No Model.)

A. S. BRIDGES.
VEHICLE SPRING.

No. 323,906. Patented Aug. 11, 1885.

Attest:
Charles Pickles
N. W. Perkins Jr.

Inventor:
Appleton S. Bridges

UNITED STATES PATENT OFFICE.

APPLETON S. BRIDGES, OF ST. LOUIS, MISSOURI.

VEHICLE-SPRING.

SPECIFICATION forming part of Letters Patent No. 323,906, dated August 11, 1885.

Application filed June 29, 1885. (No model.)

*To all whom it may concern:*

Be it known that I, APPLETON S. BRIDGES, a resident of the city of St. Louis, in the State of Missouri, and a citizen of the United States, have invented a new and useful Improvement in Vehicle-Springs; and I do hereby declare the following to be a full, clear, and accurate description of the same, reference being had to the annexed drawings and letters marked thereon.

Figure 1:
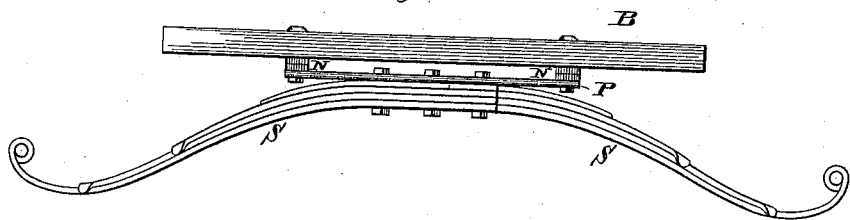
Figure 2:
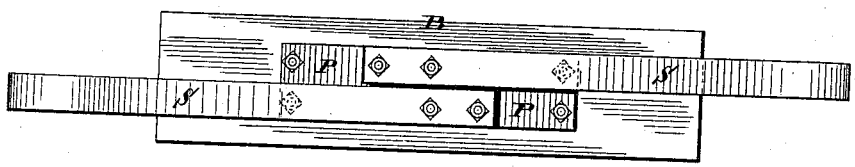
Figure 3:
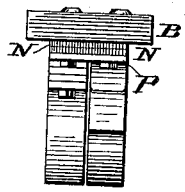

Figure 1 in the drawings is a side elevation of my spring. Fig. 2 is a bottom view of my spring. Fig. 3 is an end elevation of my spring.

The object of my invention is to construct a spring with great elasticity at its base, so as to avoid sudden jars and consequent breaking of the springs. The nature of it consists in providing the springs at their bases with a spring-bar, upon which they rest and to which they are attached, and also in providing said spring-bar with cushions at each end, of leather or other pliable material, which will give or yield to the pressure of the spring-bar, and thus produce a pliable bearing for the seat of the springs, instead of a rigid bearing, as heretofore constructed.

B in the drawings is an ordinary bar of wood running with the springs, and to which the body of the vehicle is attached, and to which the spring-bar P is attached by means of bolts or other appropriate means.

N N are cushions made of leather and serve to hold the spring-bar P away from the bar B, and also serve to form cushions or pliable bearings for the ends of the spring-bar P, so as to prevent sudden jars from the vehicle on the spring-bar P and on the springs S S.

P is a flat piece of steel, which will spring by the pressure of the springs S S upon it, and to it are bolted or otherwise appropriately attached the springs S S at or near its center.

S S are springs made like quarter elliptical springs bent up at their smaller ends and furnished with an eye with which to attach to the side bar of the vehicle. They are made, in the ordinary way, of one or more leaves, and have bolt-holes at their butt-ends, by which they are bolted to the spring-bar P.

The whole thus combined makes a durable and elastic spring, and it is much less liable to break by a severe jar of the vehicle than if there were no cushions N N or spring-bar P to relieve the jar of the vehicle.

Now, what I claim, and ask Letters Patent to be granted to me for, is—

1. A vehicle spring composed of the springs S S, attached to the spring-bar P at or near its center, the spring-bar P, supported at each end by the cushions N N, and the bar B, substantially as above described.

2. In a vehicle-spring, the cushions N N, attached to the spring-bar P at its ends and forming a support for the same, in combination with said spring-bar P.

In testimony whereof I have hereunto set my hand on this 18th day of June, 1885.

APPLETON S. BRIDGES.

Witnesses:
WM. M. ECCLES,
WALTER C. CARR.